(12) United States Patent
Lu et al.

(10) Patent No.: US 9,664,975 B2
(45) Date of Patent: May 30, 2017

(54) ELECTROCHROMIC DEVICE

(71) Applicant: Tintable Smart Material Co., Ltd., Tainan (TW)

(72) Inventors: Chung-Cheng Lu, Tainan (TW); Cheng-Hao Liu, Tainan (TW); Yi-Wen Chung, Tainan (TW)

(73) Assignee: Tintable Smart Material Co., Ltd., Tainan (TW)

( * ) Notice: Subject to any disclaimer, the term of this patent is extended or adjusted under 35 U.S.C. 154(b) by 277 days.

(21) Appl. No.: 14/679,153

(22) Filed: Apr. 6, 2015

(65) Prior Publication Data

US 2016/0170277 A1   Jun. 16, 2016

(30) Foreign Application Priority Data

Dec. 10, 2014 (TW) ................. 103143003

(51) Int. Cl.
  *G02F 1/153* (2006.01)
  *G02F 1/155* (2006.01)
  *G02F 1/161* (2006.01)
  G02F 1/1345 (2006.01)

(52) U.S. Cl.
  CPC .............. *G02F 1/155* (2013.01); *G02F 1/161* (2013.01); *G02F 2001/13456* (2013.01)

(58) Field of Classification Search
  CPC ........ G02F 1/155; G02F 1/1523; G02F 1/157; G02F 1/161; G02F 1/153; G02F 1/1533; G02F 1/15; G02F 2001/1519; G02F 2202/38; G02F 2203/12; B32B 17/10036; B32B 17/10339; B32B 2307/40; B32B 33/00; E06B 2009/2464; E06B 2009/2643
  See application file for complete search history.

(56) References Cited

U.S. PATENT DOCUMENTS

| | | | | |
|---|---|---|---|---|
| 6,111,684 A | * | 8/2000 | Forgette | B60Q 1/2665 359/265 |
| 6,441,942 B1 | * | 8/2002 | Branz | G02F 1/1533 359/265 |
| 7,733,555 B2 | * | 6/2010 | Agrawal | B60R 1/088 359/245 |
| 8,780,432 B1 | * | 7/2014 | Nguyen | G02F 1/1347 359/265 |
| 2005/0064116 A1 | * | 3/2005 | Sha | B32B 17/06 428/34 |

(Continued)

FOREIGN PATENT DOCUMENTS

CN   103168269 A   6/2013

*Primary Examiner* — Scott J Sugarman
*Assistant Examiner* — Balram Parbadia
(74) *Attorney, Agent, or Firm* — Husch Blackwell LLP

(57) ABSTRACT

In an electrochromic device, upper and lower electrodes are formed respectively on upper and lower substrates, and an electrochromic laminate is sandwiched between upper and lower central regions of the upper and lower electrodes. A looped spacer is disposed between the upper and lower electrodes to surround the electrochromic laminate. A rib member extends from the looped spacer and is fitted in a slot of the upper electrode. An upper electrode contact is disposed between the looped spacer and an upper marginal region of the upper electrode. A lower electrode contact is disposed between the looped spacer and a lower marginal region of the lower electrode.

10 Claims, 5 Drawing Sheets

(56) References Cited

U.S. PATENT DOCUMENTS

| | | | |
|---|---|---|---|
| 2005/0095454 A1* | 5/2005 | Ko | C07C 13/62 428/690 |
| 2010/0165440 A1 | 7/2010 | Nguyen et al. | |
| 2013/0133814 A1* | 5/2013 | Shang | B32B 38/00 156/182 |

* cited by examiner

ELECTROCHROMIC DEVICE

CROSS-REFERENCE TO RELATED APPLICATION

This application claims priority from Taiwanese application no. 103143003, filed on Dec. 10, 2014, the disclosure of which is incorporated in its entirety herein by reference.

FIELD

The disclosure relates to an electrochromic device.

BACKGROUND

An electrochromic device is capable of varying its light transmission in response to the application of an electric field, and can be used for applications such as windows, rear-view mirrors, etc. When the electrochromic device is used as a rear-view mirror, it can control the flow of light reflected toward the driver so as to prevent the driver from being blinded by bright lights from a following car.

As shown in FIGS. 1 and 2, a conventional electrochromic device includes a front glass substrate 11, a rear glass substrate 13, a front transparent electrode layer 17 formed on a rear surface of the front glass substrate 11, a rear transparent electrode layer 15 formed on a front surface of the rear glass substrate 13, an electrochromic laminate 16 disposed between the front and rear transparent electrode layers 17, 15, and a looped adhesive layer 14 surrounding the electrochromic laminate 16 and disposed between the front and rear transparent electrode layers 17, 15 to thereby bond the front glass substrate 11 to the rear glass substrate 13. The electrochromic laminate 16 includes an active layer (not shown) made of an electrochromic material, an ion storage layer (not shown), and an electrolyte layer (not shown) sandwiched between the active layer and the ion storage layer. The transparency of the electrochromic laminate 16 can be varied by applying an electric field between the front and rear transparent electrode layers 17, 15.

To apply an electric field between the front and rear transparent electrode layers 17, 15, the front and rear glass substrates 11, 13 should overlap in such a way as to partially expose the front and rear transparent electrode layers 17, 15, as shown in FIG. 1. The exposed portions of the front and rear transparent electrode layers 17, 15 may be protected by two protecting members 12. However, as the frame need be constructed to cover the protecting members 12 when the electrochromic device is assembled to a frame for a window or a rear-view mirror so that the electrochromic device can be firmly retained in the frame, the effective surface area of the conventional electrochromic device is undesirably reduced.

SUMMARY

Therefore, an object of the disclosure is to provide a novel electrochromic device which has a relatively large effective surface area.

According to the disclosure, an electrochromic device includes upper and lower substrates, upper and lower electrodes, a looped spacer, a rib member, upper and lower electrode contacts, and an electrochromic laminate. The upper substrate is light-transmissive, and has an upper peripheral edge. The lower substrate has a lower peripheral edge. The upper electrode is light-transmissive, is formed on the upper substrate, and has an upper central region, an upper marginal region surrounding the upper central region, and a slot formed between the upper central region and the upper marginal region. The lower electrode is formed on the lower substrate, and has a lower central region and a lower marginal region surrounding the lower central region. The looped spacer is made from an electrical insulating material, and has an upper surface facing the upper marginal region, a lower surface facing the lower marginal region, and an inner peripheral surface interconnecting the upper and lower surfaces. The rib member is made from an electrical insulating material, extends upwardly from the upper surface of said looped spacer, and is configured to be fitted in the slot. The rib member and the inner peripheral surface cooperatively define an accommodation space. The upper electrode contact has an upper contact body disposed between the upper marginal region and the upper surface of the looped spacer, and an upper terminal tab extending from the upper contact body outwardly of the upper marginal region. The lower electrode contact has a lower contact body disposed between the lower marginal region and the lower surface of the looped spacer, and a lower terminal tab extending from the lower contact body outwardly of the lower marginal region. The electrochromic laminate is disposed in the accommodation space and is sandwiched between the upper central region and the lower central region.

BRIEF DESCRIPTION OF THE DRAWINGS

Other features and advantages of the disclosure will become apparent in the following detailed description of the embodiment with reference to the accompanying drawings, in which.

DETAILED DESCRIPTION

Figure 1:
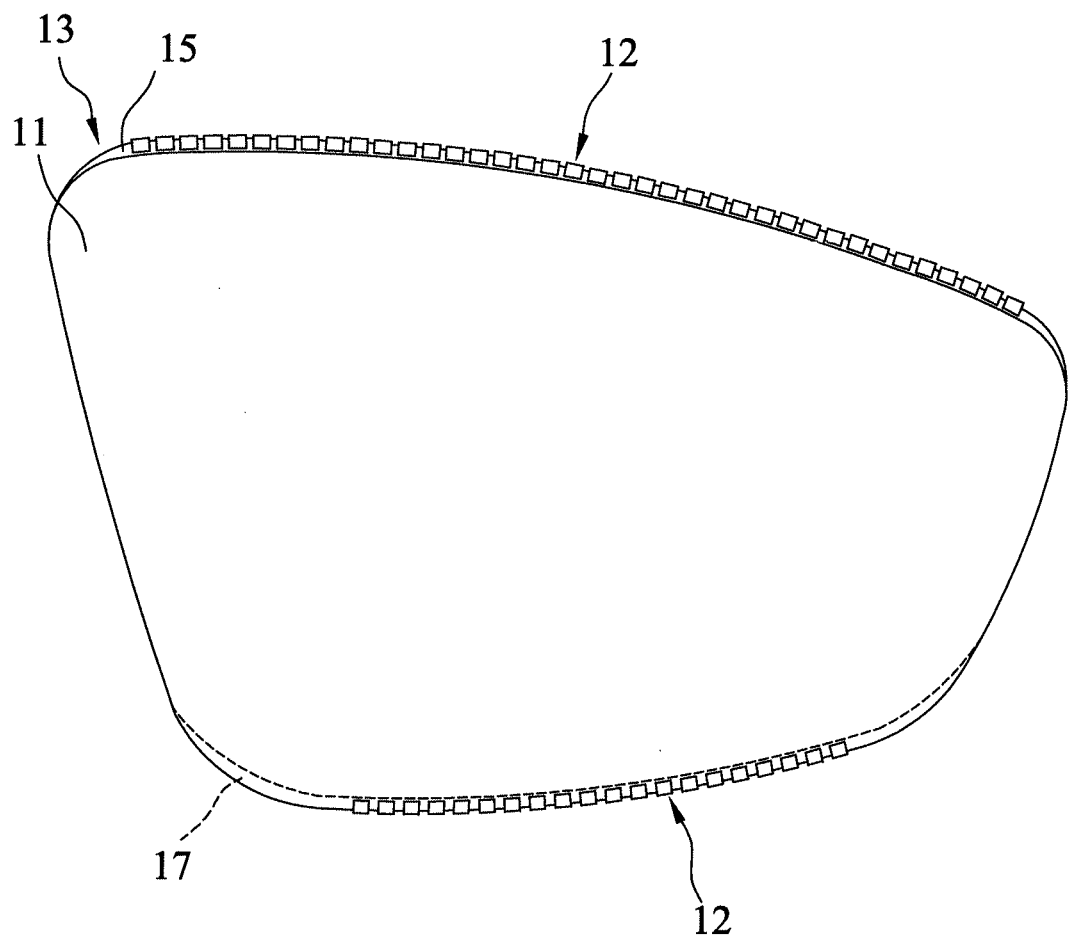
FIG. 1 is a front view of a conventional electrochromic device.
Figure 2:
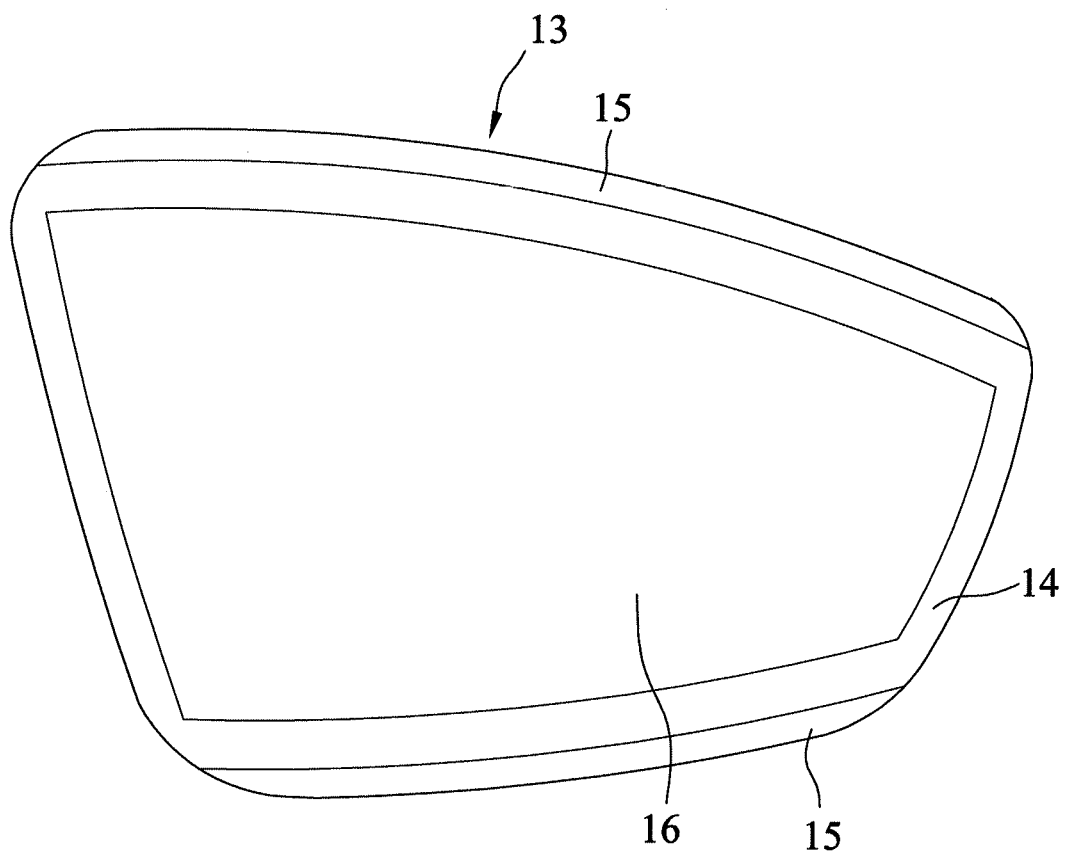
FIG. 2 is a front view of the conventional electrochromic device without a front glass substrate and a front transparent electrode layer.
Figure 3:
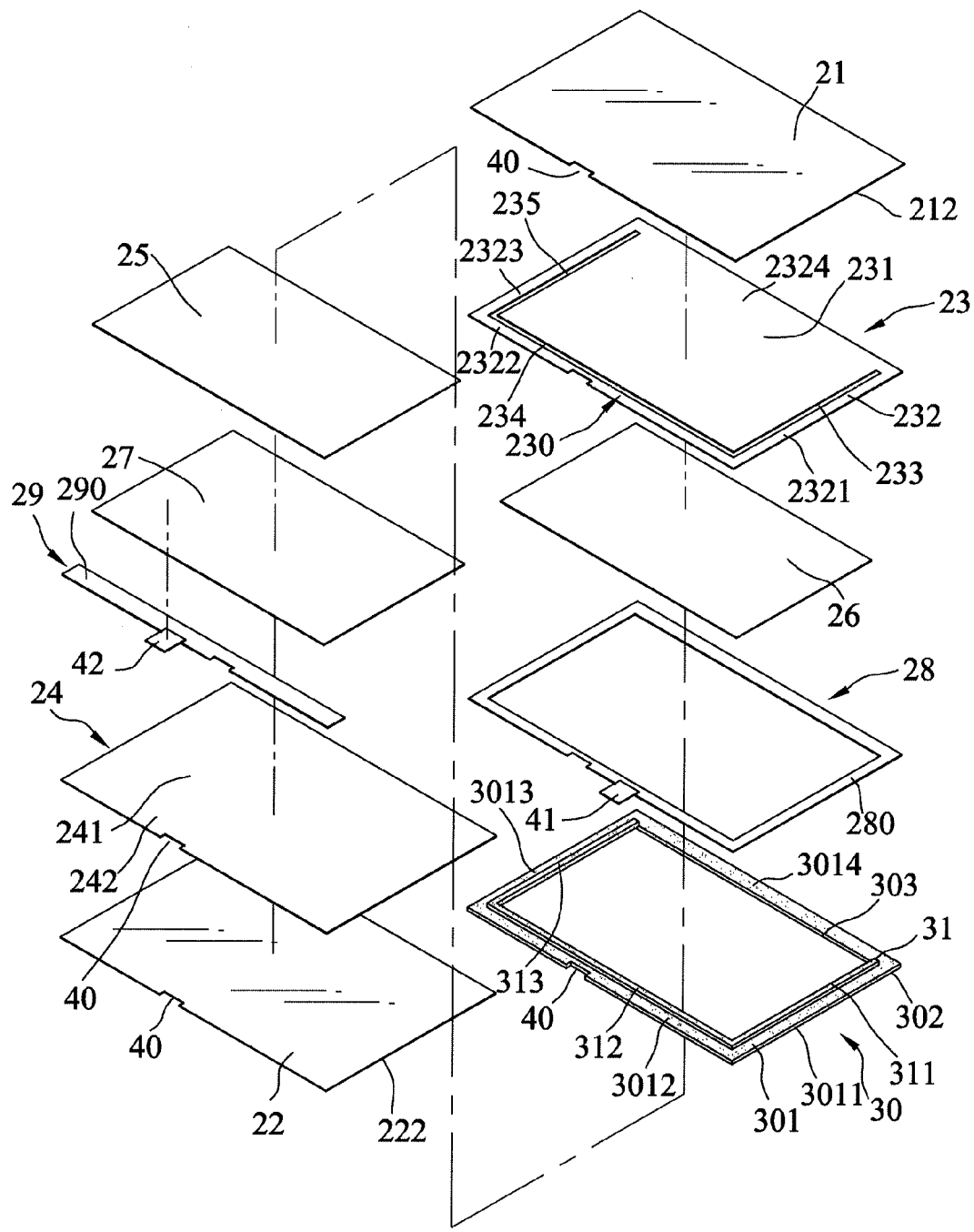
FIG. 3 is an exploded perspective view of an electrochromic device according to the disclosure.
Figure 4:
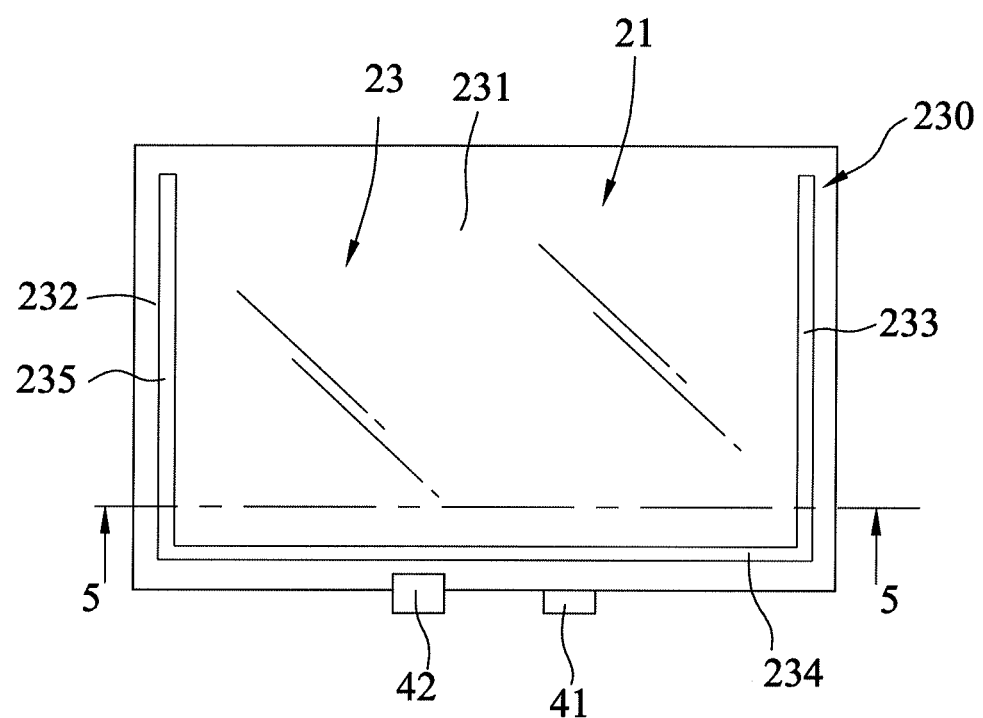
FIG. 4 is a top view of the electrochromic device of FIG. 3 in an assembled state.
Figure 5:
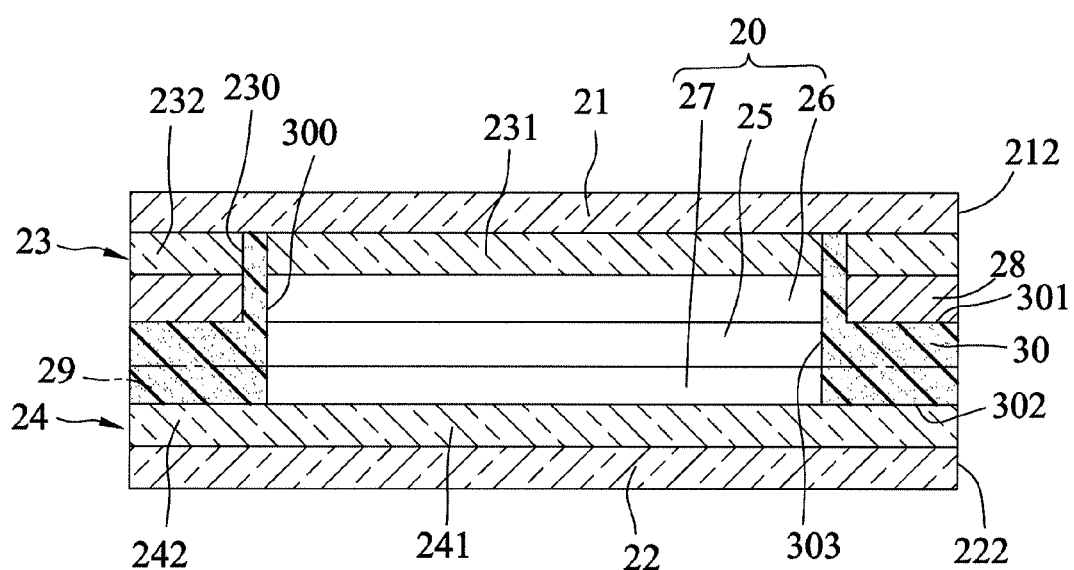
FIG. 5 is a cross-sectional view taken along line 5-5 of FIG. 4.

With reference to FIGS. 3, 4 and 5, an electrochromic device according to an embodiment of the disclosure includes an upper substrate 21, a lower substrate 22, an upper electrode 23, a lower electrode 24, a looped spacer 30, a rib member 31, an upper electrode contact 28, a lower electrode contact 29, and an electrochromic laminate 20.

The upper and lower substrates 21, 22 are made of a light-transmissive material, such as glass, plastic, etc., and have the same dimensions such that when the upper substrate 21 is disposed on the lower substrate 22, a peripheral edge 212 of the upper substrate 21 is flush with a peripheral edge 222 of the lower substrate 22.

Each of the upper and lower electrodes 23, 24 is light-transmissive and is made of a transparent conductive material, such as indium tin oxide (ITO), indium zinc oxide (IZO), etc. In this embodiment, the upper and lower substrates 21, 22 and the upper and lower electrodes 23, 24 have the same dimensions, and are of a rectangular shape.

The upper electrode 23 is formed on the upper substrate 21, and has an upper central region 231, an upper marginal region 232 surrounding the upper central region 231, and a slot 230 formed between the upper central region 231 and the upper marginal region 232. In this embodiment, the upper marginal region 232 has four marginal sub-regions 2321, 2322, 2323, 2324, and the slot 230 has three slot segments 233, 234, 235. The slot segment 233 is disposed between the upper central region 231 and the marginal sub-region 2321, the slot segment 234 is disposed between the upper central region 231 and the marginal sub-region 2322, and the slot segment 235 is disposed between the upper central region 231 and the marginal sub-region 2323.

The lower electrode 24 is formed on the lower substrate 22, and has a lower central region 241 and a lower marginal region 242 surrounding the lower central region 241. The lower central region 241 and the lower marginal region 242 correspond in position to the upper central region 231 and the upper marginal region 232, respectively.

The looped spacer 30 is made from an electrical insulating material, and has an upper surface 301 facing the upper marginal region 232, a lower surface 302 facing the lower marginal region 242, and an inner peripheral surface 303 interconnecting the upper and lower surfaces 301, 302. In this embodiment, the upper surface 301 of the looped spacer 30 has four surface regions 3011, 3012, 3013, 3014 which respectively correspond to the four marginal sub-regions 2321, 2322, 2323, 2324 of the upper marginal region 232 of the upper electrode 23.

The rib member 31 is made from an electrical insulating material, extends upwardly from the upper surface 301 of the looped spacer 30, and is configured to be fitted in the slot 230. The rib member 31 and the inner peripheral surface 303 of the looped spacer 30 cooperatively define an accommodation space 300. In this embodiment, the rib member has three rib segments 311, 312, 313 which extend respectively from the surface regions 3011, 3012, 3013 of the upper surface 301 of the looped spacer 30 so as to be fitted in the slot segments 233, 234, 235, respectively, and the looped spacer 30 and the rib member 31 are integrally formed. The electrical insulating material used for forming the looped spacer 30 and the rib member 31 is an adhesive.

The upper electrode contact 28 has an upper contact body 280 and an upper terminal tab 41. The upper contact body 280 is disposed between the upper marginal region 232 and the upper surface 301 of the looped spacer 30. The upper terminal tab 41 extends from the upper contact body 280 outwardly of the upper marginal region 232. In this embodiment, the upper contact body 280 of the upper electrode contact 28 is of a loop shape so as to loop around the rib segments 311, 312, 313, and is superimposed on the upper surface 301 of the looped spacer 30 to permit an electrical contact between the upper contact body 280 and the upper electrode 23 once the rib segments 311, 312, 313 are respectively fitted in the slot segments 233, 234, 235.

The lower electrode contact 29 has a lower contact body 290 and a lower terminal tab 42. The lower contact body 290 is disposed between the lower marginal region 242 of the lower electrode 24 and the lower surface 302 of the looped spacer 30. The lower terminal tab 42 extends from the lower contact body 290 outwardly of the lower marginal region 242 of the lower electrode 24. In this embodiment, the upper and lower terminal tabs 41, 42 extend outwardly from the same side of the electrochromic device and are offset from each other. Each of the upper and lower contact bodies 280, 290 may be made from copper, aluminum, silver, gold, molybdenum, nickel, etc.

The electrochromic laminate 20 is disposed in the accommodation space 300 and sandwiched between the upper central region 231 and the lower central region 241. The electrochromic laminate 20 includes an active layer 26, an ion storage layer 27, and an electrolyte layer 25.

The active layer 26 is disposed beneath the upper central region 231 of the upper electrode 23. In this embodiment, the active layer 26 is a layer of cathodic electrochromic material, such as viologens, tungsten trioxide ($WO_3$), vanadium (V) oxide ($V_2O_5$), etc.

The ion storage layer 27 is disposed on the lower central region 241 of the lower electrode 24. In this embodiment, the ion storage layer 27 is a layer of anodic electrochromic material, such as nickel oxide (NiO).

The electrolyte layer 25 is sandwiched between the active layer 26 and the ion storage layer 27, and is made of an electrolyte material such as a lithium perchlorate-based electrolyte solution, a solid electrolyte, etc.

When an electric field is applied to the electrochromic laminate 20 through the upper and lower electrodes 23, 24, electrochemical redox reactions occur in the active layer 26 (in some cases, also in the ion storage layer 27) to vary optical properties of the electrochromic laminate 20. Different charge states of the active layer 26 will result in different optical properties of the electrochromic device. Upon the application of an electric field (a voltage), ionic species (charges) can be drawn from the ion storage layer 27 through the electrolyte layer 25 into the active layer 26. The ionic species can also be drawn away from the active layer 26 by application of a reversed voltage.

As shown in FIGS. 3 and 4, each of the upper substrate 21, the upper electrode 23, the upper contact body 280, the looped spacer 30, the lower electrode 24, and the lower substrate 22 has a cavity 40 configured to further expose the lower terminal tab 42.

In this embodiment, the upper and lower electrodes 23, can be formed respectively on the upper and lower substrates 21, 22 by any known techniques, such as vacuum deposition, plasma enhanced chemical vapor deposition (PECVD), etc. The electrochromic laminate 20 can be formed on the upper central region 231 of the upper electrode 23 by any known techniques (such as vacuum deposition, PECVD, etc.), and the upper contact body 280 of the upper electrode contact 28 can be formed on the upper marginal region 232 of the upper electrode 23 by sputtering, vapor plating, printing, or electroplating. The upper terminal tab 41 is bonded to the upper contact body 280 by heat-pressing or supersonic welding using an electrical conductive adhesive. An electrical insulating material (an adhesive) for forming the looped spacer 30 and the rib member 31 is applied onto the upper contact body 280 such that the electrical insulating material flows through the slot 230 onto the upper substrate 21. The lower contact body 290 of the lower electrode contact 29 can be formed on the lower electrode by sputtering, vapor plating, printing, or electroplating. The lower terminal tab 42 is bonded to the lower contact body 290 by heat-pressing or supersonic welding using an electrical conductive adhesive. The upper substrate 21 is disposed on the lower substrate 22 such that the peripheral edge 212 of the upper substrate 21 is flush with the peripheral edge 222 of the lower substrate 22, and such that the electrochromic laminate 20 is disposed between the upper and lower electrodes 23, 24. Thus, the upper and lower electrodes 23, 24 respectively disposed on the upper and lower substrates 21, 22 are bonded to each other through the electrical insulating material, which constitutes the looped spacer 30 and the rib member 31.

In the electrochromic device of this disclosure, since the peripheral edge 212 of the upper substrate 21 is in line with the peripheral edge 222 of the lower substrate 22, the electrochromic device can be firmly retained in a window frame or a mirror frame without undesirably reducing the effective surface area of the electrochromic device.

In addition, as the upper and lower terminal tabs 41, 42 are disposed on the same side of the electrochromic device, it is convenient to electrically connect the upper and lower terminal tabs 41, 42 to an external power source.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An electrochromic device, comprising:
    an upper substrate which is light-transmissive, and which has an upper peripheral edge;
    a lower substrate which has a lower peripheral edge;
    an upper electrode which is light-transmissive, which is formed on said upper substrate, and which has an upper central region, an upper marginal region surrounding said upper central region, and a slot formed between said upper central region and said upper marginal region;
    a lower electrode which is formed on said lower substrate, and which has a lower central region and a lower marginal region surrounding said lower central region;
    a looped spacer made from an electrical insulating material, and having an upper surface facing said upper marginal region, a lower surface facing said lower marginal region, and an inner peripheral surface interconnecting said upper and lower surfaces;
    a rib member made from an electrical insulating material, extending upwardly from said upper surface of said looped spacer, and configured to be fitted in said slot, said rib member and said inner peripheral surface cooperatively defining an accommodation space;
    an upper electrode contact which has an upper contact body disposed between said upper marginal region and said upper surface of said looped spacer, and an upper terminal tab extending from said upper contact body outwardly of said upper marginal region;
    a lower electrode contact which has a lower contact body disposed between said lower marginal region and said lower surface of said looped spacer, and a lower terminal tab extending from said lower contact body outwardly of said lower marginal region; and
    an electrochromic laminate disposed in said accommodation space and sandwiched between said upper central region and said lower central region.

2. The electrochromic device according to claim 1, wherein said upper marginal region has four marginal sub-regions, said slot having three slot segments each of which is disposed between said upper central region and a corresponding one of said marginal sub-regions, said upper surface of said looped spacer having four surface regions which respectively correspond to said four marginal sub-regions, said rib member having three rib segments extending respectively from three of said surface regions so as to be fitted in said slot segments, respectively.

3. The electrochromic device according to claim 2, wherein said upper contact body of said upper electrode contact is of a loop shape so as to loop around said rib segments, and is superimposed on said upper surface of said looped spacer to permit an electrical contact between said upper contact body and said upper electrode once said rib segments are respectively fitted in said slot segments.

4. The electrochromic device according to claim 1, wherein said upper and lower terminal tabs are offset from each other.

5. The electrochromic device according to claim 1, wherein said lower substrate and said lower electrode are light-transmissive.

6. The electrochromic device according to claim 1, wherein said electrochromic laminate includes
    an active layer made of an electrochromic material, and disposed beneath said upper central region,
    an ion storage layer disposed on said lower central region, and
    an electrolyte layer sandwiched between said active layer and said ion storage layer.

7. The electrochromic device according to claim 1, wherein each of said upper substrate, said upper electrode, said upper contact body, said looped spacer, said lower electrode, and said lower substrate has a cavity configured to expose said lower terminal tab.

8. The electrochromic device according to claim 1, wherein said looped spacer and said rib member are integrally formed.

9. The electrochromic device according to claim 8, wherein said electrical insulating material is an adhesive.

10. The electrochromic device according to claim 1, wherein said lower substrate has the same dimensions as said upper substrate, such that when said upper substrate is disposed on said lower substrate, said lower peripheral edge is flush with said upper peripheral edge, said upper electrode having the same dimensions as said upper substrate, said lower electrode having the same dimensions as said lower substrate.

* * * * *